United States Patent [19]
Bowie et al.

[11] Patent Number: 5,987,962
[45] Date of Patent: *Nov. 23, 1999

[54] COPPER CRUSHER GAUGE HOLDER

[75] Inventors: Eugene W. Bowie, Colonial Beach; Raymond E. Bowen, Montross, both of Va.

[73] Assignee: The United States of America as represented by the Secretary of the Navy, Washington, D.C.

[*] Notice: This patent issued on a continued prosecution application filed under 37 CFR 1.53(d), and is subject to the twenty year patent term provisions of 35 U.S.C. 154(a)(2).

[21] Appl. No.: 08/929,976

[22] Filed: Sep. 15, 1997

[51] Int. Cl.$^6$ ........................................ G01M 7/00
[52] U.S. Cl. .......................... 73/12.01; 73/35.14; 29/592
[58] Field of Search ................ 73/12.01, 12.04, 73/12.08, 12.09, 35.14, 862.68; 29/592, 593

[56] References Cited

U.S. PATENT DOCUMENTS

| | | |
|---|---|---|
| 815,468 | 3/1906 | Du Pont . |
| 2,620,652 | 12/1952 | Hartmann ........................... 73/35 |
| 2,870,631 | 1/1959 | Musser et al. ...................... 73/167 |
| 3,343,400 | 9/1967 | Rogers et al. ...................... 73/12 |
| 3,693,432 | 9/1972 | Stewart et al. ..................... 73/167 |
| 3,879,982 | 4/1975 | Schmidt ............................. 73/12 |
| 4,130,624 | 12/1978 | Walker ........................... 73/862.68 |
| 4,696,182 | 9/1987 | Meir .................................. 73/12 |
| 4,738,146 | 4/1988 | Buamgartner et al. .......... 73/862.68 |
| 4,821,584 | 4/1989 | Lembke .......................... 73/862.68 |
| 4,982,664 | 1/1991 | Norton ............................. 102/272 |
| 5,222,399 | 6/1993 | Kropp ............................ 73/862.68 |
| 5,551,279 | 9/1996 | Quick ............................. 73/12.01 |
| 5,777,225 | 7/1998 | Sada et al. ....................... 73/488 |

*Primary Examiner*—Max Noori
*Attorney, Agent, or Firm*—James B. Bechtel, Esq.

[57] ABSTRACT

A copper crusher gauge holder for testing internal pressures of cartridges during test firing is provided. The copper crusher gauge holder has a circular aluminum upper plate and a circular aluminum lower plate having a layer of urethane rubber approximately ¾ inch thick sandwiched between the plates. The gauge holder is bored to hold copper crusher gauges and center-bored to fit over a cartridge centerline primer tube. A series of machine screws hold the plates together and allow for tightening the screws once the copper crusher gauge holder is in place in a cartridge to be tested. As the machine screws are tightened, the urethane rubber expands laterally gripping the inside of the cartridge and gripping the copper crusher gauges. A method to manufacture the gauge holder is provided.

1 Claim, 3 Drawing Sheets

COPPER CRUSHER GAUGE HOLDER

ORIGIN OF THE INVENTION

The invention described herein was made in the performance of official duties by an employee of the Department of the Navy and may be manufactured, used, licensed by or for the Government for any governmental purpose without payment of any royalties thereon.

1. Field of the Invention

The invention described herein relates to explosive pressure test devices and in particular to crusher gauges for measuring peak pressure within weapons and artillery shells during gun fire.

2. Background of the Invention

Crusher gauges have been known in the art for many years. Some earlier examples include a copper pellet crusher using a piston arrangement as depicted in U.S. Pat. No. 2,620,652 by Hartmann (1952). A later disclosure, U.S. Pat. No. 2,870,631 by Musser et al (1959) depicts a device for positioning and housing of crusher gauges. In more recent years, it has been desired to measure peak pressures inside large caliber artillery shells. In order to accomplish these measurements, cylindrically-shaped crusher gauges have been used. As these crusher gauges must remain oriented and positioned within a shell during the firing of the shell, gauge holders within the shell are necessary. Typical of such prior art gauge holder is the neoprene holder device having a neoprene locking ring. The neoprene holder has a series of bore holders around the periphery for insertion of the crusher gauges. Additionally, a center bore is provided for the purpose of mounting the holder by sliding it over the shell's primer tube. The locking ring is also center-bored and is slid down over the primer tube in a similar manner. As the locking ring's outside diameter is slightly greater than the inside diameter of the edges of the peripheral holes on the holder, the locking ring wedges against the crusher gauges holding them in place.

Certain problems remain with these prior art holders. Typically, these gauge holders are inserted into the neoprene disk that is placed over the primer tube at the bottom of the cartridge case. Another neoprene disk, the locking ring, is placed over the gauge holder assembly. When the propelling charge with the gauge holder assembly is rammed to its seated position, the assembly slides forward on the primer tube as the propellant bed shifts forward (leaving a finite space). During ignition, the gauge assembly is forced into the base of the case damaging the gauges. During this process gauges may be dislodged from the holder and upon extraction and ejection of the spent case the gauges fall into the gun operating mechanism, foul the gun barrel, are propelled through the barrel forward of the gun mount or remain in the cartridge case. When the gauge holder is slammed into the base of the cartridge case the steel/copper holder is deformed and could be affecting the copper gauge readings.

SUMMARY OF THE INVENTION

Accordingly, it is an object of the invention to provide a crusher gauge holder which encapsulates and protects crusher gauges during the propellant ignition process.

It is another object of the invention to provide a crusher gauge holder having means for retaining gauges and holder in position and seated against the base of the cartridge case during the entire cycle of loading, firing, extracting and ejecting.

Yet another object of the invention is to provide a crusher gauge holder.

In accordance with these and other objects, the invention is a copper crusher gauge holder comprising a cylindrical assembly having an upper plate and a lower plate sandwiching a layer of pliable material. The upper and lower plates are connected by machine screws with a gap between the plates of ¾ of an inch. The lower plate is threaded to accept the machine screws, while the upper plate has a snug fit sufficient to hold the plates in position during assembly. Both plates are pre-drilled with four holes to accept copper crusher gauges and to a center bore hole to form a loose fit over the center primer tube. To form the assembly, the plates are connected by machine screws leaving a ¾ inch gap between plates.

The plate-screw combination is then inserted into a cartridge case by sliding the combination over the cartridge primer tube. Using the cartridge as a mold, urethane rubber or other pliable material is poured into the base of the cartridge. After curing, the assembly is removed from the cartridge and the copper crusher gauge holes are cleared of rubber. The gauge holder is now ready for use by inserting copper crusher gauges in each gauge hole and re-inserting the assembly into a cartridge to be tested. After the assembly is seated at the bottom of the cartridge, the machine screws are tightened a few turns causing the rubber to expand lateral thereby securing the assembly to the center primer tube and also securing each crusher gauge in place.

BRIEF DESCRIPTION OF THE DRAWINGS

The foregoing objects and other advantages of the present invention will be more fully understood from the following detailed description and reference to the appended drawings wherein.

DETAILED DESCRIPTION OF THE INVENTION

Figure 1:
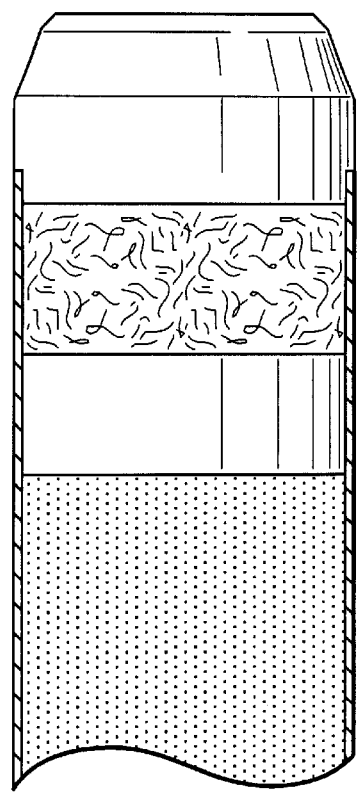
FIG. 1 is a cross-sectional side view of a cartridge case showing the copper crusher gauge holder installed within the cartridge.
Figure 1:
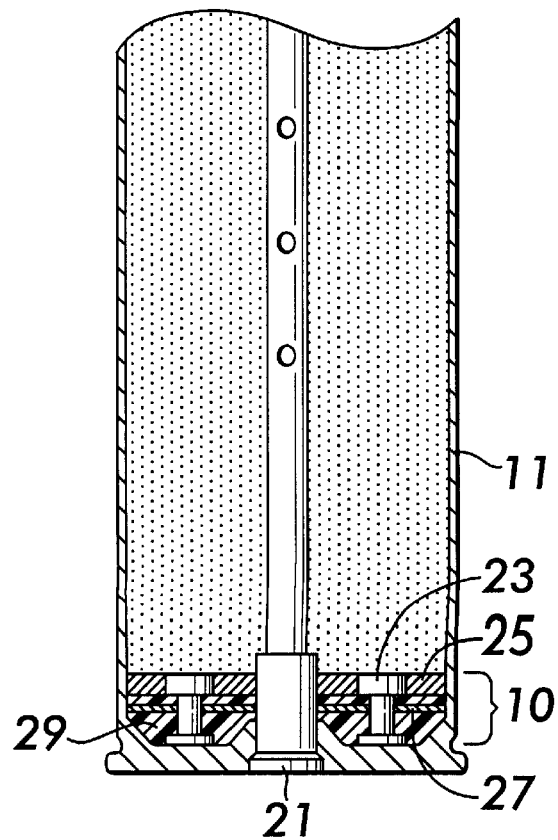

Referring now to FIG. 1, the copper crusher gauge holder 10 of the present invention is shown installed in a cartridge case 11. Copper crusher gauge holder 10 is located against the internal base of the cartridge case 11 and inserted over the center primer tube, in this embodiment a MK-45 primer with a MK-9 cartridge.

Figure 2:
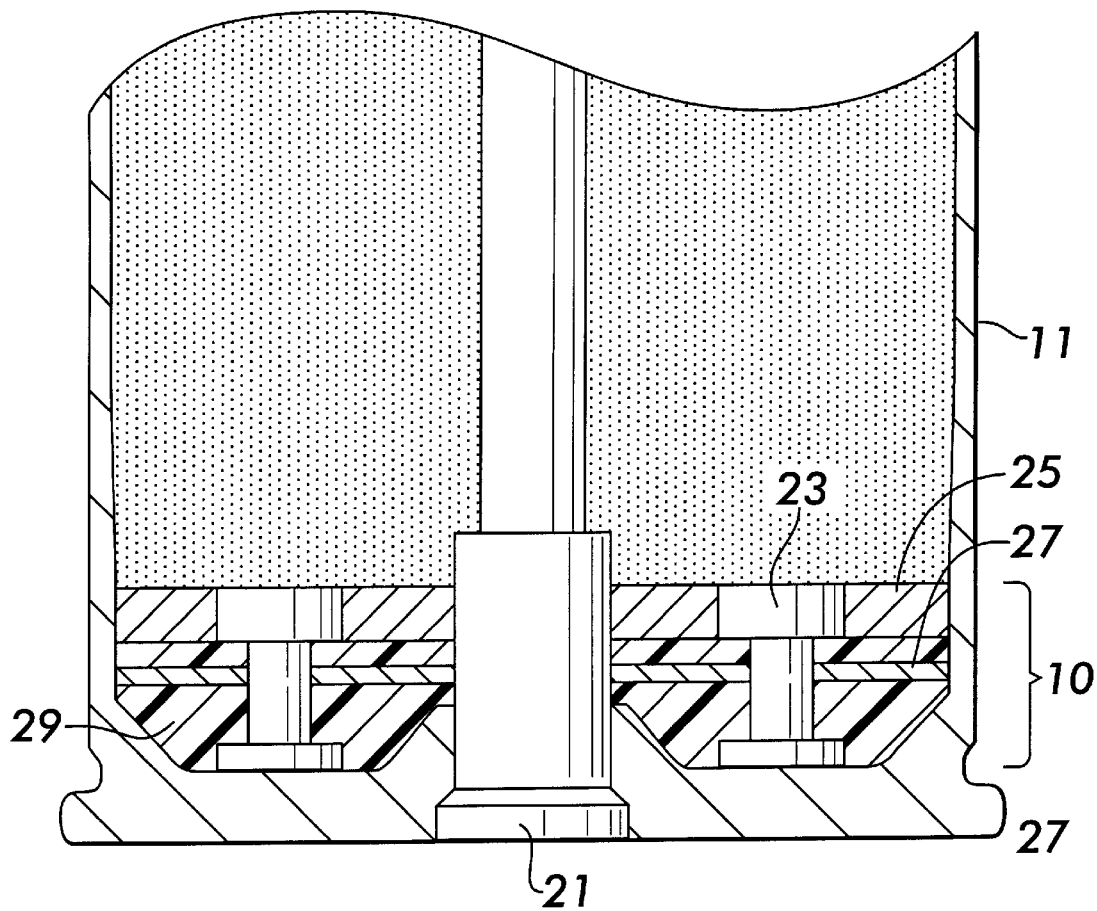
FIG. 2 is an enlarged partial cross-sectional side view showing the major components of the copper crusher gauge holder.

The major components of the copper crusher gauge holder 10 may be seen by reference to FIG. 2, an enlarged view of the base of cartridge case 11. The center primer tube 21 serves as a center support for the copper crusher gauge holder 10 around which an upper plate 25 and lower plate 27 are located. In the preferred embodiment, both upper and lower plates were fabricated using 6061T6 aluminum plate. The copper crusher gauges 23 are located in bore holes with the plates. A pliant substrate material 29 is located below upper plate 25 and surrounding lower plate 27 and further filling the base of the cartridge case 11. The copper crusher gauge holder 10 is secured to the center primer tube 21 and to the outer walls of cartridge case 11 by expansion of the pliant substrate material as plates 25 and 27 are drawn together. Likewise, copper crusher gauges 23 are also held in place by expansion of the pliant substrate material.

Figure 3:
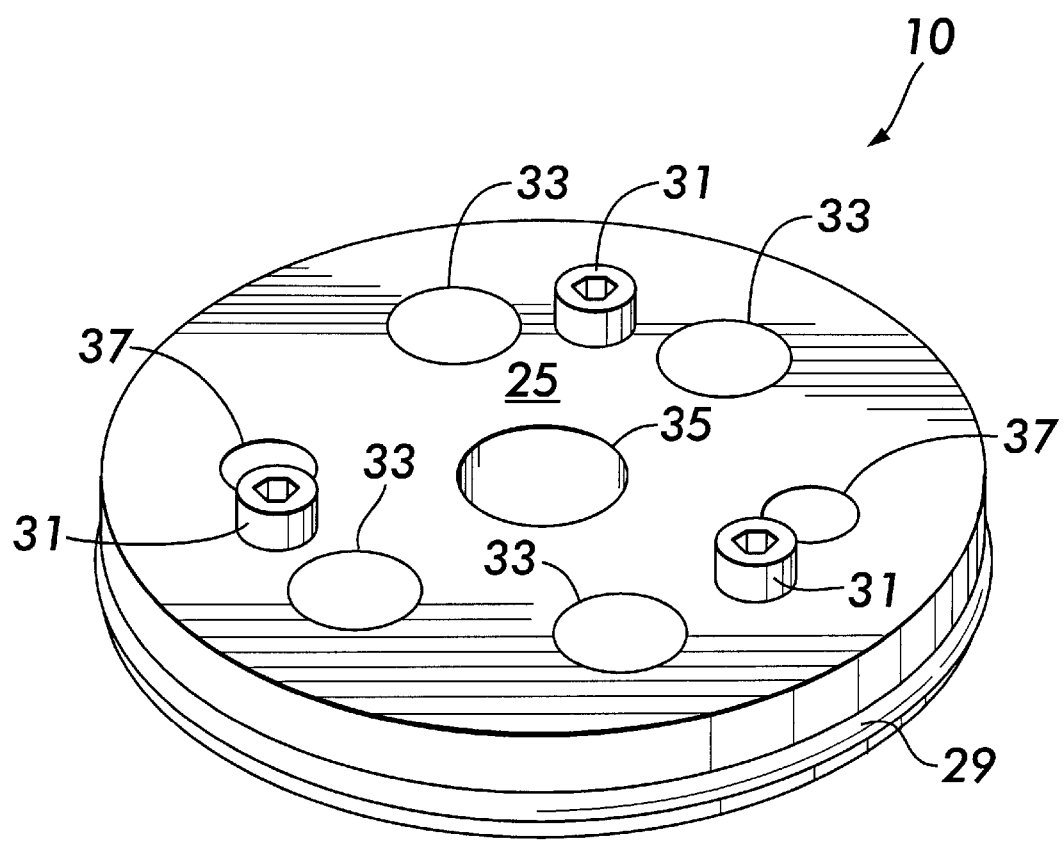
FIG. 3 is a perspective view of the copper crusher gauge holder.

Referring now to FIG. 3, the configuration of the copper crusher gauge holder 10 is shown. Upper plate 25 has a series of four larger holes 33 sized to permit insertion of copper crusher gauges. Additionally, two smaller holes 37 are provided to allow the copper crusher gauge holder 10 to be filled with pliant or rubber material. In the preferred embodiment, a urethane rubber was used having a durometer hardness range between 60 and 90. A center bore hole 35 is provided to fit over the center primer tube of the cartridge case. The entire assembly is held together by three machine screws 31, threaded into the lower plate and friction fitted to the upper plate, which also function to compress the pliant material after installation in a cartridge case so as to hold the device in place and to hold the copper crusher gauges in place. Manufacture of the copper crusher gauge holder 10 is accomplished at the test site using the unassembled components, i.e., upper plate 25, three machine screws 31, four copper gauges, and a cut-off base of a cartridge which is used as a mold. The upper and lower plates are attached together using the machine screws leaving a gap between the plates of approximately ¾ of an inch. Next, copper crusher gauges are inserted in the holes 33 and the entire assembly is placed over a primer tube and inside a cut-off section of a cartridge on which a test is required. A liquid rubber or other pliant material is then added through one of the holes 37, the opposite hole 37 acting as a vent. Once the material has hardened, the copper crusher gauge holder is completed and may be removed from the mold cartridge. Test may then be conducted on the same size cartridge by inserting the preformed copper crusher gauge holder in the cartridge and tightening the machine screws to cause the urethane rubber to expand laterally, thereby gripping both the inside of the cartridge and the copper crusher gauges.

The features and advantages of the copper crusher gauge holder are numerous. The gauge holder encapsulates and protects the gauges during the propellant ignition process. The gauge holder and gauges are retained in the cartridge during the entire cycle of load, fire, extraction and ejection. The new features include gauge holder encapsulation, retention techniques for both the gauge holder to the cartridge case and gauge holder to the gauges.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A method for manufacturing a copper crusher gauge holder comprising the steps of:

cutting an upper plate to form a disc having an outside diameter slightly smaller than the inside diameter of a cartridge case to be tested;

boring a series of holes to said upper plate to receive copper crusher gauges;

boring a series of holes into said upper plate to receive machine screws;

boring a center hole into said upper plate for fitting over a cartridge center primer tube;

boring filler and vent holes into said upper plates; cutting a lower plate to form a disc having an outside diameter slightly smaller than the inside diameter of the base of a cartridge core to be tested;

boring a series of holes into said lower plate to receive copper crusher gauges;

boring and threading a series of holes into said lower plate to receive machine screws;

boring a center hole into said lower plate for fitting over a center primer tube;

attaching said upper plate and lower plate together using machine screws and leaving a fillable gap between said plates;

inserting the attached upper and lower plates into a cut-off portion of a cartridge case, the case to form a mold;

inserting copper crusher gauges into each of the series of copper crusher gauge holders;

adding a liquid plaint material through the filler hole to fill the fillable gaps between said plates; and curing the liquid pliant material.

* * * * *